United States Patent
Thiriet et al.

(10) Patent No.: US 9,951,694 B2
(45) Date of Patent: Apr. 24, 2018

(54) SYSTEM AND METHOD FOR EMERGENCY STARTING OF AN AIRCRAFT TURBOMACHINE

(71) Applicants: SNECMA, Paris (FR); TURBOMECA, Bordes (FR); HERAKLES, Le Haillan (FR)

(72) Inventors: Romain Thiriet, Jurancon (FR); Patrick Marconi, Gelos (FR); Camel Serghine, Boeil-bezing (FR); Antoine Marie Georges Caratge, Moissy-Cramayel (FR); Francois Danguy, Moissy-Cramayel (FR); Laurent Fabbri, Moissy-Cramayel (FR); Pierre Yvart, Ballancourt sur Essonne (FR); Laurent Soulie, Bordeaux (FR); Philippe Barrat, Saint Medard en Jalles (FR)

(73) Assignees: SAFRAN AIRCRAFT ENGINES, Paris (FR); SAFRAN HELICOPTER ENGINES, Bordes (FR)

( * ) Notice: Subject to any disclaimer, the term of this patent is extended or adjusted under 35 U.S.C. 154(b) by 52 days.

(21) Appl. No.: 15/022,101

(22) PCT Filed: Sep. 12, 2014

(86) PCT No.: PCT/FR2014/052263
§ 371 (c)(1),
(2) Date: Mar. 15, 2016

(87) PCT Pub. No.: WO2015/040310
PCT Pub. Date: Mar. 26, 2015

(65) Prior Publication Data
US 2016/0230672 A1      Aug. 11, 2016

(30) Foreign Application Priority Data
Sep. 19, 2013   (FR) .................... 13 58996

(51) Int. Cl.
*F02C 7/27*   (2006.01)
*F01D 19/00*  (2006.01)
(Continued)

(52) U.S. Cl.
CPC ............. *F02C 7/277* (2013.01); *B64D 27/10* (2013.01); *F01D 19/00* (2013.01); *F02C 7/272* (2013.01);
(Continued)

(58) Field of Classification Search
CPC .......... F02C 6/206; F02C 7/277; F02C 7/272; B64D 27/10; F01D 19/00; F05D 2260/85; Y02T 50/672
See application file for complete search history.

(56) References Cited

U.S. PATENT DOCUMENTS 5,069,692 A * 12/1991 Grennan ................ B64D 13/00
                                                              96/136

FOREIGN PATENT DOCUMENTS

EP   2267288    12/2010
FR   1207024     2/1960
(Continued)

OTHER PUBLICATIONS

International Search Report with English Language Translation, dated Jan. 20, 2015, Application No. PCT/FR2014/052263.

*Primary Examiner* — Rodney A Butler
(74) *Attorney, Agent, or Firm* — Womble Bond Dickinson (US) LLP

(57) ABSTRACT

An emergency start system for a turbine engine of an aircraft including at least one solid propellant gas generator, an electrically controlled ignition device, a computer connected to the ignition device, and at least one starter motor comprising a turbine for driving a shaft which is for coupling to a shaft of the turbine engine The outlet of the gases from the (Continued)

generator are connected to the inlet of the turbine of the starter motor.

6 Claims, 2 Drawing Sheets

(51) Int. Cl.
    *B64D 27/10*     (2006.01)
    *F02C 7/277*     (2006.01)
    *F02C 7/272*     (2006.01)
    *F02C 6/20*     (2006.01)

(52) U.S. Cl.
    CPC .......... *F02C 6/206* (2013.01); *F05D 2260/85* (2013.01); *Y02T 50/672* (2013.01)

(56) References Cited

FOREIGN PATENT DOCUMENTS

| | | |
|---|---|---|
| FR | 1361269 | 5/1964 |
| FR | 1448767 | 3/1966 |
| FR | 2967132 | 5/2012 |

\* cited by examiner

SYSTEM AND METHOD FOR EMERGENCY STARTING OF AN AIRCRAFT TURBOMACHINE

TECHNICAL FIELD

The present invention relates to an emergency start system and to an emergency start method for a turbine engine of an aircraft, and in particular of a helicopter.

PRIOR ART

In the case of a twin helicopter (FR 2 967 132 and FR 2 967 133), critical situations can arise when one of the engines is voluntarily shut down. Indeed, this mode is recommended to minimise consumption during search phases and en-route phases. In this context, two exceptional situations can occur, which then require an emergency restart of the shut-down engine:
- the one active engine stops or slows down considerably following a malfunction or incident; and
- the flying conditions deteriorate unexpectedly, which requires a return to twin-engine mode (insufficient flying altitude, for example).

Currently, a turbine engine is typically started by means of an electric starter motor powered by the helicopter's on-board power supply. However, the performance of this system is incompatible with the demand required for an emergency restart. It is possible to adapt the electrical system, but this requires mass use of expensive and disadvantageous technology (synchronous machine having permanent magnets, power electronics and dedicated battery packs, etc.).

Typically, a conventional start sequence of an idle engine takes around 30 seconds, which could be too long depending on the flying conditions, for example at low altitude in the event of an at least partial failure of the single active engine. If the idle engine is not restarted in time, it may become critical to land with the engine experiencing difficulties.

More generally, the emergency situations that can arise in the applications considered above need reaction time of around a few seconds, in order to ensure an emergency start or restart within a sufficient safety margin.

In particular, the present invention provides a simple, effective and economical solution to this requirement. However, the invention is not limited to the above application and can be used to ensure the emergency start of a turbine engine of any type of aircraft or helicopter equipped with more than two engines, for example a triple engine helicopter.

SUMMARY OF THE INVENTION

To this end, the invention proposes an emergency start system for a turbine engine of an aircraft, characterised in that it comprises at least one solid-propellant gas generator, an electrically controlled ignition device, a computer connected to the ignition device, and at least one starter motor comprising a turbine for driving a shaft intended for being coupled to a shaft of the turbine engine, the gas outlet of the generator being connected to the inlet of the turbine of the starter motor.

The invention thus proposes a new technology for ensuring the emergency start of an aircraft turbine engine. This technology uses a solid-propellant gas generator that is relatively compact and can be integrated in a turbine engine or an aircraft in a simple manner. A solid propellant is an energetic material containing the oxidiser elements (combustion agent) and reducing elements (fuel), which allow for high-energy gaseous combustion products to be generated by combustion (redox reaction). According to the invention, the energetic material is a solid propellant. This propellant is, for example, a homogenous or composite propellant.

An emergency start system based on a solid-propellant has a high power density and high energy density compared with an electric accumulator, and allows the action to occur much more quickly. This system also boasts complete autonomy with regard to the helicopter's electric network, in particular if the ignition device is controlled by the computer of the turbine engine.

When an emergency situation is detected, the computer is designed to activate the ignition device of the gas generator. The gases produced by the generator rotate the rotor of the turbine and thus the shaft for driving the shaft of the turbine engine.

Advantageously, the gas outlet of the generator is connected to the inlet of the turbine by a distribution valve connected to the computer.

According to another embodiment of the invention, the system comprises two independent starter motors intended for starting two turbine engines independently of one another. The gas outlet of the generator is connected to the inlet of the turbine of each starter motor.

The computer controls the valve so that the gases from the combustion of the propellant feed the turbine of the starter motor associated with the turbine engine that requires an emergency start.

The outlet of the turbine of the or each starter motor is preferably connected to the exhaust. This is advantageous because, if the rotor of the turbine were locked against rotation, the gases generated by the gas generator would pass through the rotor to the exhaust, without the risk of the turbine exploding.

The turbine of the or each starter motor can comprise one single rotor wheel. The turbine of the starter motor is, for example, designed to generate an average power of from 40-50 kW over a period of around 3 s. If higher performance is required, the turbine could consequently be optimised and would include more than one stage, for example.

The shaft driven by the turbine is preferably connected to a freewheel designed to transmit a driving torque only when said torque comes from the starter motor. The rotor of the turbine of the starter motor is thus not driven by the shaft of the turbine engine during operation, which ensures an optimum service life of the starter motor. In a variant, the shaft driven by the turbine can be directly connected to the shaft of the turbine engine or by transmission means designed to transmit a driving torque when said torque comes from one shaft or the other of the starter motor and the turbine engine. The shaft driven by the turbine can be coupled to the shaft of the turbine engine by means of an accessory gearbox.

The present invention also relates to an aircraft, such as a helicopter, comprising at least one turbine engine and at least one starter system as described above.

The aircraft can comprise at least two turbine engines, each turbine engine being associated with an independent starter system or with an overall starter system consisting of one starter motor per turbine engine and a common gas generator.

The present invention also relates to a method for emergency starting a turbine engine of an aircraft by means of a system as described above, characterised in that the ignition device is activated by the computer as soon as an emergency start situation is detected.

DESCRIPTION OF THE DRAWINGS

The invention will be better understood and other details, features and advantages of the invention will emerge from reading the following description, given by way of non-limiting example and with reference to the accompanying drawings, in which.

DETAILED DESCRIPTION

Figure 1:
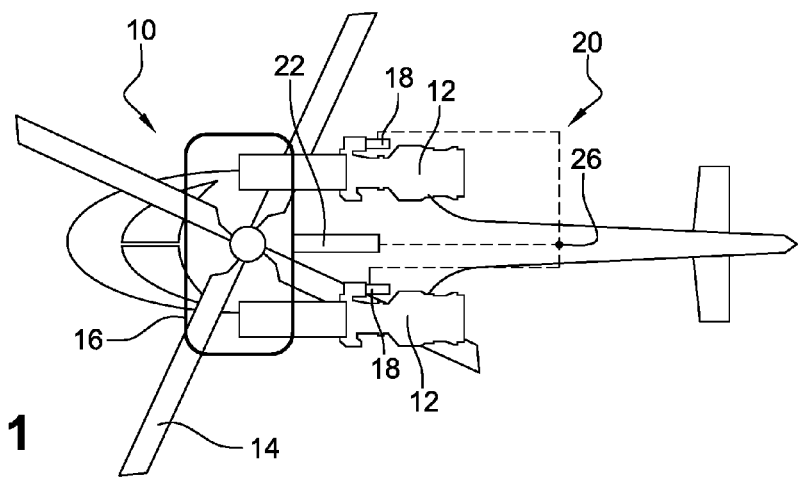
FIG. 1 is a very schematic view of a twin helicopter equipped with an emergency start system according to the invention.
Figure 2:
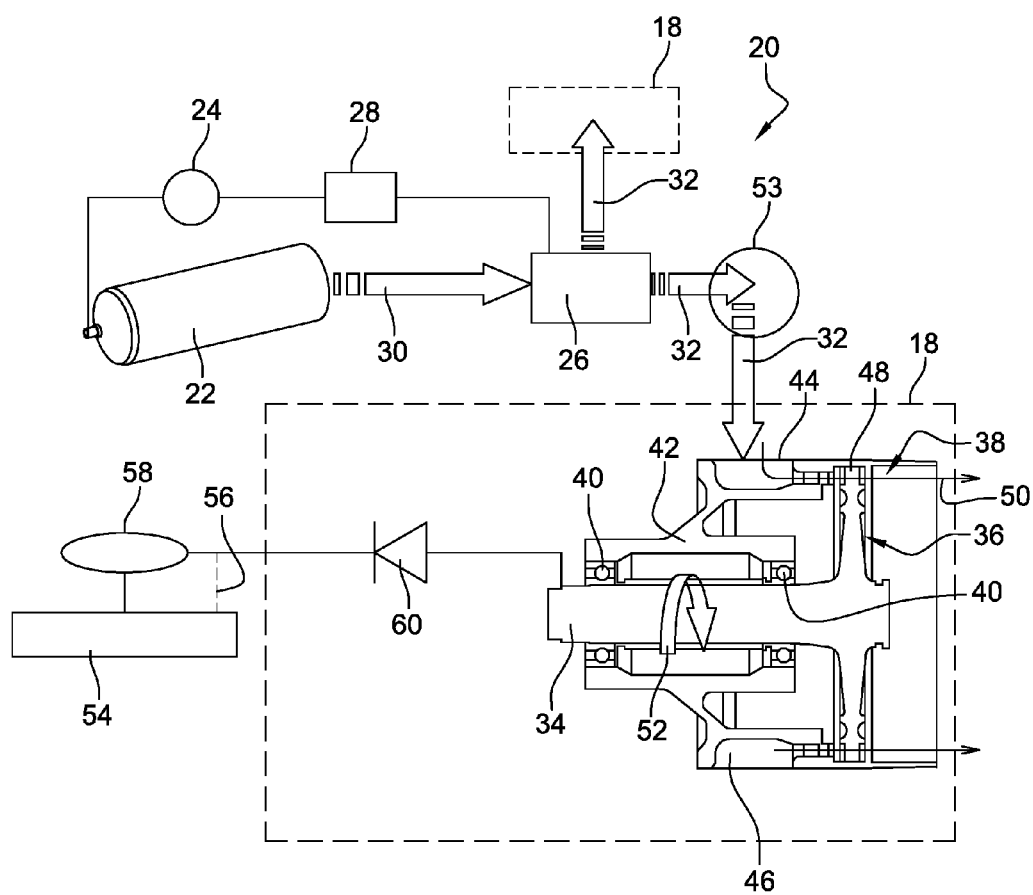
FIG. 2 is a schematic view of an emergency start system according to the invention, together with an axial sectional view of a starter motor of this system.

FIGS. 1 and 2 show an embodiment of the invention which, in this case, is applied to a twin helicopter 10, this helicopter comprising two turbine engines 12 for driving the rotor of the propeller 14 by means of a main gearbox 16.

Each turbine engine is equipped with a starter motor 18, which is part of an emergency start system 20 according to the invention (FIG. 2), the system 20 thus comprising two starter motors 18 in this case.

The system 20 further comprises a solid-propellant gas generator 22, an electrically controlled device 24 for igniting the solid propellant, a distribution valve 26 connecting the gas outlet of the generator to the starter motors 18, and a computer 28 connected to the ignition device 24 and to the valve so as to control said starter motors.

Here, the gas generator 22 comprises an elongate cylindrical body that contains one or more loads of solid propellant, which are shaped according to the desired gas flow law of the generator, said body acting as a combustion chamber. It should be noted that the desired gas flow law can be achieved by selecting the shape of the load appropriately and/or by completely or partly lining some portions of the load.

Once the surface of the propellant load has been ignited, the surface of the load burns and advances, producing combustion gases under high pressure, according to the flow law resulting from the shape and the lining of the load. The gases are ejected at the outlet of the generator. The combustion temperature inside the generator 22 is typically in the range of between 1400 K and 2700 K.

The ignition device 24 is controlled electrically by the computer 28 and is designed to activate the combustion of the propellant as soon as a corresponding signal is output by the computer 28.

The distribution valve 26 is, for example, a proportional three-way valve and comprises an inlet channel connected to the outlet of the generator 22 (arrow 30) and two outlet channels connected to the starter motors 18 (arrows 32), respectively. The valve 26 is such that the inlet channel can only be connected to one of the outlet channels, such that the system 20 according to the invention is designed to execute an emergency restart on only one turbine engine at a time. The inlet channel is brought into fluid communication with one outlet channel or the other, depending on a signal output by the computer 28.

The computer 28 is an electronic control unit such as those currently used in the field of aeronautics. When said computer detects an emergency situation, it activates the distribution valve 26 and the ignition device 24 such that the starter motor 18 of the turbine engine to be started is fed the combustion gases generated by the combustion of the solid propellant.

FIG. 2 is a schematic view of one embodiment of the starter motor 18, shown in axial section. Said starter motor substantially comprises a shaft 34 supporting a rotor wheel 36 of a turbine 38, for example a supersonic turbine, the shaft 34 being guided in rotation by bearings 40 mounted in a casing 42 of the starter motor. The casing 42 comprises a radial opening 44, which forms the inlet of the turbine 38 and opens into an annular cavity 46 for feeding the turbine. Said cavity 46 can have a constant cross section from upstream to downstream or, on the other hand, can have a cross section that changes from upstream to downstream.

The combustion gases that enter the cavity 46 are depressurised and flow through the blades 48 of the wheel 36 (arrows 50), which rotates the wheel 36 and thus the shaft 34 about its axis (arrow 52). The gases then escape from the turbine 38 through an exhaust nozzle thereof, and are ejected to the outside (arrows 50).

Cooling means can be provided upstream of the turbine so as to reduce the temperature of the combustion gases, for example to 600 K. Furthermore, a filter 53 can be fitted upstream of the turbine so as to limit the entry of solid particles into the duct of the turbine.

The shaft 34 is designed to transmit a starting torque to a shaft 54, for example a high-pressure shaft, of the turbine engine with which the starter motor 18 is associated. This torque can be transmitted directly, as shown schematically in dashed lines 56, or by means of transmission means such as an accessory gearbox 58.

However, it is preferable for the torque to be transmitted between the shaft 34 and the shaft 54 or the accessory gearbox 58 by means of a freewheel 60. This freewheel is shown schematically by a diode, since the function of the freewheel is to transmit a torque if it comes from the shaft 34, but not if it comes from the shaft 54. Once the turbine engine has started, the shaft 34 no longer drives the shaft 54.

Figure 3:
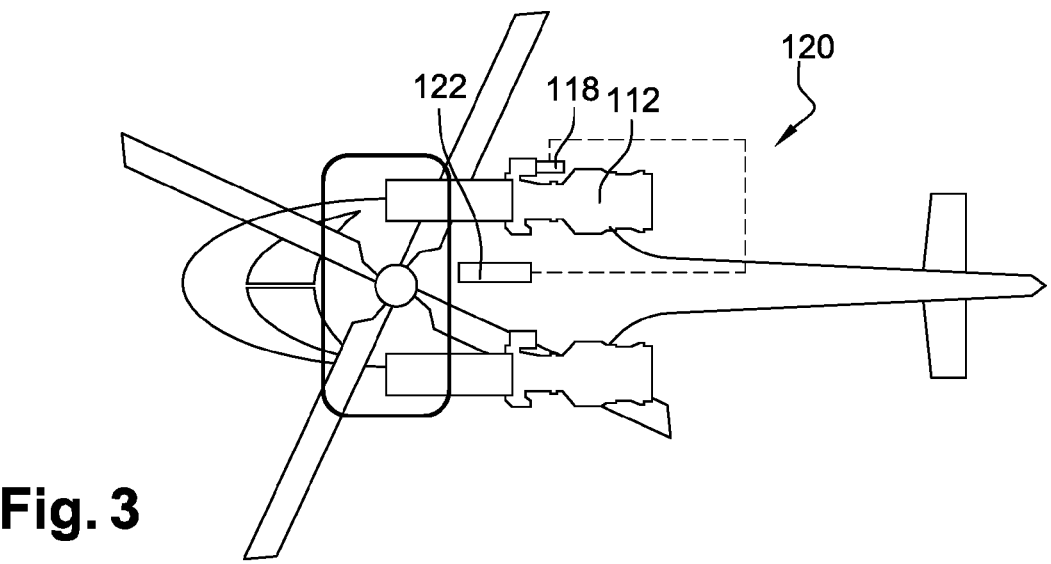
FIGS. 3 and 4 are views similar to FIG. 1 that show alternative embodiments of the invention.

In the alternative embodiment shown in FIG. 3, the starter system only comprises one starter motor 118; the emergency start system 120 is therefore only associated with one turbine engine 112 and does not comprise a distribution valve, the outlet of the gases from the generator 122 being directly connected to the inlet of the turbine of the starter motor.

Figure 4:
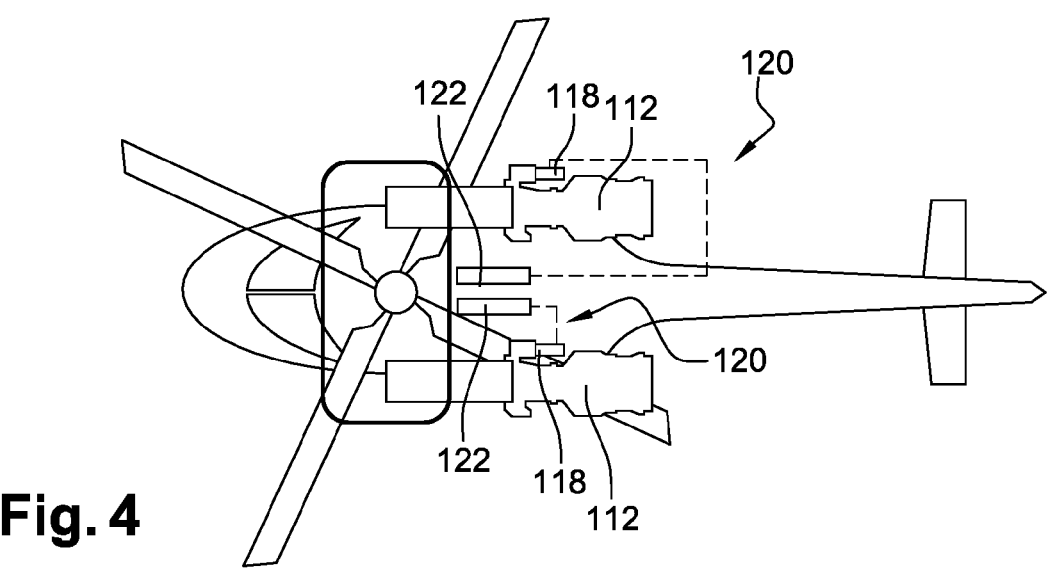

In the alternative embodiment shown in FIG. 4, each twin-helicopter turbine engine 112 is associated with its own starter system 120, which is thus independent of the other system 120. Each system 120 comprises a generator 122 and a starter motor 118.

In another variant of the invention (not shown), a starter system could comprise more than one generator for generating gas by combustion of a solid propellant, for example in the form of a "cluster"; the generators would be installed in parallel and would be actuated in a manner offset over time in order to adjust the overall flow of hot gases feeding the starter motor.

The invention claimed is:

1. Emergency start system for at least two turbine engines of an aircraft, which comprises:
   at least one solid-propellant gas generator,
   an electrically controlled ignition device,
   a computer connected to the ignition device,
   a distribution valve connected to the computer, and
   at least two independent starter motors,
wherein, each independent starter motor is intended for starting one correspondent turbine engine, each starter motor comprising a turbine for driving a shaft, the shaft for coupling to a shaft of the corresponding turbine engine, a gas outlet from the generator being connected by the distribution valve to an inlet of the turbine of each starter motor.

2. System according to claim 1, wherein the output of the turbine of each starter motor is connected to an exhaust.

3. System according to claim 1, wherein the turbine of each starter motor comprises a single rotor wheel.

4. System according to claim 1, wherein the system comprises coupling elements for coupling the shaft driven by the turbine to the shaft of the turbine engine, said coupling elements including a freewheel designed to transmit a driving torque only when said torque comes from the starter motor.

5. Aircraft comprising at least two turbine engines, which comprises an emergency start system according to claim 1.

6. Method for emergency starting a turbine engine of an aircraft with a system according to claim 1, comprising:
   detecting an emergency start situation,
   activating the ignition device by the computer as soon as the emergency start situation is detected.

\* \* \* \* \*